United States Patent [19]

Sobus

[11] Patent Number: 4,631,193
[45] Date of Patent: Dec. 23, 1986

[54] TREATING BEER TO PREVENT CHILL HAZE

[75] Inventor: Michael T. Sobus, Philadelphia, Pa.

[73] Assignee: PQ Corporation, Valley Forge, Pa.

[21] Appl. No.: 769,034

[22] Filed: Aug. 26, 1985

Related U.S. Application Data

[63] Continuation-in-part of Ser. No. 674,802, Nov. 26, 1984, abandoned.

[51] Int. Cl.⁴ .............................................. C12H 1/02
[52] U.S. Cl. ................................. 426/330.4; 426/423
[58] Field of Search .................. 426/330, 330.3, 330.4, 426/423, 424, 425, 422

[56] References Cited

U.S. PATENT DOCUMENTS

| | | |
|---|---|---|
| 3,617,301 | 11/1971 | Barby . |
| 3,903,316 | 9/1975 | Hoover . |
| 4,027,046 | 5/1977 | Bohm et al. ...................... 426/330.5 |
| 4,109,017 | 8/1978 | Grampp et al. ................... 426/330.5 |
| 4,515,821 | 5/1985 | Armstead et al. .................. 426/423 |

Primary Examiner—Raymond N. Jones
Assistant Examiner—Carolyn Paden
Attorney, Agent, or Firm—Ernest G. Posner; Stephen Bobb; Fred C. Philpitt

[57] ABSTRACT

The components of chill haze in beer can be removed by contacting said beer with a combination of silica hydrogel and gelatin for a time sufficient to complete adsorption of the components and removing said adsorbents from the beer.

12 Claims, No Drawings

TREATING BEER TO PREVENT CHILL HAZE

This application is a continuation in part of my co-pending patent application U.S. Ser. No. 674,802, filed Nov. 26, 1984, now abandoned.

BACKGROUND OF THE INVENTION

This invention relates to chill-proofing beverages such as beer. The invention involves the use of a combination of silica gel and gelatin to remove various colloidal components of raw beer which form haze upon chilling.

The term "beer" as used in this specification and the claims includes many types of brewed beverages. Such beverages include, but are not limited to, lager, pilsner, Dortmund and Munich beers as well as top fermented beverages such as ale, porter and stout.

Turbidity is an important and at times troublesome aspect encountered in brewing operations. It can be of biological or physicochemical origins. Gross turbidity caused by suspended solids substantially above the colloidal range can be overcome by filtering or other separation methods. Various filter aids called fining agents are used to coagulate such coarse particles. Secondary and more subtle turbidity problems involve the haze which develops on aging and/or chilling the previously filtered beer. This haze is caused by the coagulation of a number of organic materials in the beer. These materials are not removed by the previously described filtration step.

A number of methods have been developed to remove at least some of the chill haze formers in beer. Among these methods are reaction with other organic material to precipitate filtrable compounds. A number of adsorbents are also used to remove certain fractions that cause chill haze. Silica hydrogels and xerogels, calcium, aluminum and magnesium silicates, diatomaceous earth, several types of natural minerals and clays and mixtures thereof have been suggested and used as chill-proofing agents. U.S. Pat. Nos. that disclose such art include the following: 3,163,538; 3,251,693; 3,436,225; 3,617,301; 3,940,498 and 3,958,023. These materials and methods have been successful with some beers but less than satisfactory with other beers.

U.S. Pat. No. 4,109,017 teaches that solids suspended in some fruit juices can be flocculated by using a combination of gelatin and a silica sol. U.S. Pat. No. 4,027,046 teaches that combinations of gelatin and silica sol are not particularly well suited for removing protein fractions from fruit juice and wine. If the silica sol is modified with an aluminum species the combination is more effective. These silica sol-gelatin combinations are directed to turbidity fractions rather than those organics that cause chill haze.

It is an object of this invention to provide a combination of adsorbents that removes a wide range of chill haze components in a wide variety of brewed beverages.

SUMMARY OF THE INVENTION

Combinations of silica gel and gelatin provide excellent protection from chill haze formation in a wide variety of beers and other brewed beverages. Such combinations that contain very limited proportions of gelatin provide significantly enhanced performance over either material used alone. The silica gel and gelatin can be added to the beer separately or they can be combined prior to addition. Contact between the combination and the beer is maintained for a time sufficient for adsorption of the chill haze components. The filtering removes the adsorbents now containing the undesirable material.

While gelatin has been used as a fining agent with various beverages, its performance in chillproofing beer in unexpected in that performance of combinations that contain more than about 5% gelatin is significantly reduced from that of the silica gel alone. Surprisingly, combinations that contain less than about 5% gelatin and, indeed, very little gelatin (about 0.2%) show significant improvement over the silica gel alone.

THE INVENTION

The major component of my chillproofing combination is a siliceous material capable of sorbing the colloidal fractions in beer that combine to cause haze upon aging and/or chilling. Usually, this siliceous material is a silica gel, prepared by adding acid to an alkali metal silicate solution under conditions that produce a hydrosol that completely solidifies upon aging. The properties of such gels are dependent upon the gel conditions, the technique used to dry, and other treatment. Silica gels formed with sufficient acid to at least completely neutralize the alkali in the silicate are designated regular density gels, which tend to have larger surface areas with smaller pores and pore volumes. If not all the alkali is neutralized, intermediate density gels are formed, which tend to have smaller surface areas with larger pores and pore volumes. Drying either regular or intermediate density gels using the usual techniques shrinks the pores, thereby forming regular density or intermediate density xerogels. Replacing the water in the pores of the hydrogel with a solvent having a high vapor pressure and flash drying produces an aerogel which does not exhibit shrinkage of the pores. The surface area and density of the regular density gel can be altered by heating at various pH values and salt concentrations. Further discussion of gel preparation can be found in Iler, *The Chemistry of Silica*, (Wiley-Interscience, New York: 1979).

Another type of silica gel is especially useful in my combination. This silica is a specially prepared silica hydrogel with a surface area of at least 700 m$^2$/g, a mean pore diameter of 30 to 120 Å, an average particle size of 20 microns or less and a loss on ignition of at least 50% by weight. The preparation and properties of this hydrogel are disclosed in U.S. Pat. No. 3,617,301. This patent is hereby incorporated by reference.

Gelatins as required for the combination and process of my invention are commercially available products. These materials are typically derived proteins of the fibrous class obtained by the partial hydrolysis of collagen derived from the skins, white connective tissues and bones of various animals. The production of gelatin starts with washing the various tissues that contain collagen with cold water. The washed tissues are then soaked in cold, dilute mineral acid to induce swelling. After maximum swelling is achieved, the excess acid is removed by washaing and the tissues extracted with hot water. The extract is filtered and then concentrated. The gelatin solution is chilled and the desired physical form fabricated. I prefer the material to be in powder form.

The chill-proofing combination of my invention contains less than about 5 pbw of gelatin per 100 pbw of silica gel, i.e., less than 4.75% gelatin. I prefer the combination to contain about 0.2 to 4 pbw of gelatin per 100 pbw of the gel, i.e., 0.2 to 3.85% gelatin. I most prefer about 0.5 to 3 pbw of gelatin, i.e., 0.4 to 2.9% gelatin. The components can be added to the beer separately, but I prefer that they be added as a blend. The required blending can be done in any manner, but can be accomplished during milling of the hydrogel. The gelatin can also be introduced into the gel during formation.

The combination can be contacted with the beer in any convenient manner and removed by any appropriate separation techniques. The level of treatment should be sufficient to remove the chill haze components, usually being between 20 and 2,000 parts per million (ppm) based on the beer. I prefer to use about 200 to 800 ppm of the combination.

The chillproofing combination of my invention is added to the beverage in any convenient manner. It is mantained in contact for a time sufficient to adsorb the material desired and separated by filtering or centrifuging.

The combination of my invention can also be used with other beer treating agents such as filter aids, magnesium silicate, and polyvinylpolypyrrolidone, when desired.

EXAMPLES

The following examples illustrate certain embodiments of our invention. These examples are not provided to establish the scope of the invention, which is described in the disclosure and recited in the claims. The proportions are in parts by weight (pbw) or percent by weight (% wt/wt) unless otherwise indicated.

EXAMPLE 1

Chillproofing tests were carried out with a commercial beer as follows. The raw beer was contacted with 700 ppm of the adsorbent which included silica gel and silica gel with gelatin. Contact was maintained for 15 to 17 minutes until separated by filtering. The beer was then force aged by heating at 60° C. for five days. The beer was cooled to room temperature and the turbidity measured in formazin nephelometer turbidity units (FTU) corrected for blank values. The beer was then chilled to 0° C. for one day and the turbidity measured again. The results are summarized in Table 1. The silica gel had a surface area of 800 m²/g, loss on ignition of 66.5% and a mean pore diameter of 87 Å.

TABLE 1

| Composition (%) | | Haze (FTU) | |
|---|---|---|---|
| Silica Gel | Gelatin | At RT | After 1 day at °C. |
| None | | 173 | 800 |
| 100 | | 45 | 314 |

TABLE 1-continued

| Composition (%) | | Haze (FTU) | |
|---|---|---|---|
| Silica Gel | Gelatin | At RT | After 1 day at °C. |
| 98 | 2 | 43 | 305 |
| 96 | 4 | 43 | 326 |
| 90 | 10 | 47 | 780 |

These results indicate that silica gel-gelatin combinations must contain a surprisingly small amount of gelatin to provide beneficial results and that larger amounts of gelatin actually provide inferior chillproofing performance.

I claim:

1. A composition for treating beer to prevent chill haze consisting of 0.2 to 4.0 parts by weight (pbw) of gelatin and 100 pbw of a silica gel.

2. The composition of claim 1 wherein the silica gel is a regular density xerogel or an intermediate density xerogel.

3. The composition of claim 1 wherein the silica gel is a hydrogel having a surface area of at least 700 m²/g, a mean pore diameter of 30 to 120 Å, an average particle size of 20 microns or less and a loss on ignition of at least 50 percent by weight (%w/w).

4. The composition of claim 2 wherein there is 0.5 to 3 pbw of gelatin and 100 pbw of silica gel.

5. The composition of claim 3 wherein there is 0.5 to 3 pbw of gelatin and 100 pbw of silica gel.

6. A method of treating beer to prevent chill haze comprising the steps of:
   a. contacting said beer with a suffient amount of a combination of gelatin and silica gel to remove chill haze components, said combination being 0.2 to 4 pbw of gelatin and 100 pbw of a silica gel,
   b. maintaining said contact for a time sufficient to absorb the chill haze component; and
   c. separating the combination from the beer.

7. The method of claim 6 wherein the beer is contacted with 20 to 2000 parts per million (ppm) of the combination of gelatin and silica gel.

8. The method of claim 5 wherein the combination is 0.5 to 3 pbw of gelatin and 100 pbw of silica gel.

9. The method of claim 6 wherein the silica gel is a regular density xerogel or an intermediate density xerogel.

10. The method of claim 7 wherein the silica gel is a regular density xerogel or an intermediate density xerogel.

11. The method of claim 8 wherein the silica gel is a regular density xerogel or an intermediate density xerogel.

12. The method of claim 6 wherein the silica gel is a hydrogel having a surface area of at least 700 m²/g, a mean pore diameter of 30 to 120 Å, an average particle size of 20 microns or less and a loss on ignition of at least 50 percent by weight (%w/w).

* * * * *